Feb. 28, 1961  H. KLEINSCHMIDT ET AL  2,973,179
BALL FAUCET VALVE
Filed Feb. 11, 1958
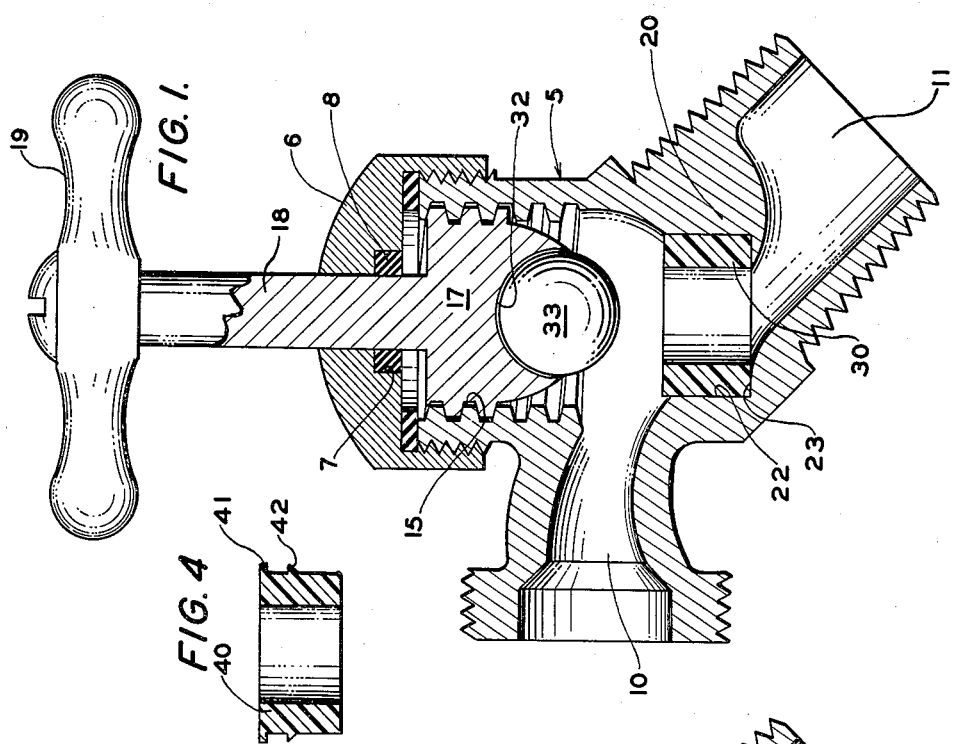
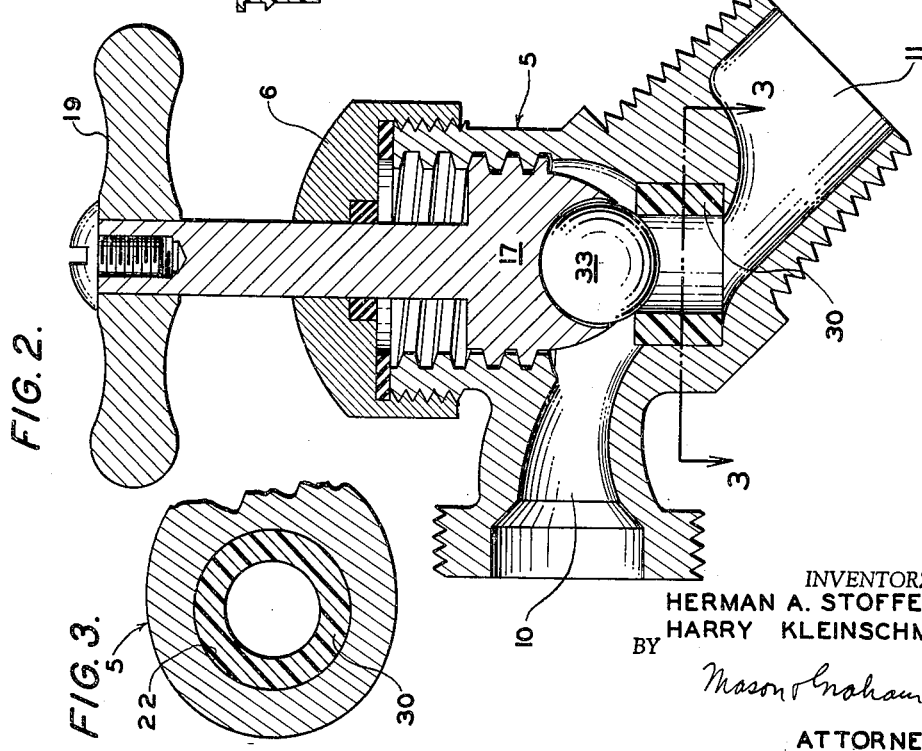
INVENTORS.
HERMAN A. STOFFEL
HARRY KLEINSCHMIDT
BY
Mason & Graham
ATTORNEYS 27
United States Patent Office 2,973,179
Patented Feb. 28, 1961

2,973,179

BALL FAUCET VALVE

Harry Kleinschmidt, Burbank, Calif. (23954 Haynes St., Canoga Park, Calif.), and Herman A. Stoffel, 140 N. Hamilton Road, Columbus, Ohio Filed Feb. 11, 1958, Ser. No. 714,590

1 Claim. (Cl. 251—86)

This invention has to do with improvements in ball faucet valves.

Ball faucet valves are, of course, known in the art, but those of which we are aware have possessed shortcomings which have prevented them from going into any extensive commercial use. Their principal shortcoming has been that, by virtue of their construction, they are subject to too much wear, requiring that parts be frequently replaced. For instance, in the prior ball valves, the valve closure has been effected by rotating a plated metal ball against a metal seat to create a seal, which produces a scraping action damaging both the ball and the seat.

We have discovered that we are able to overcome the objections to prior ball valves by utilizing, in combination with a stainless steel ball mounted so as to be free to float in its mounting socket, a nylon valve seat ring. In our valve, the nylon seat conforms and adheres to the ball, so that the ball does not have to be rotated against the seat ring in order to provide a complete seal. That is, when the valve is actuated to move the ball against the seat, the ball ceases to rotate as soon as it contacts the seat. Thereafter, during the closing operation, the ball remains stationary, as against rotation, while the ball actuating and carrying member continues to rotate relative to the ball until the desired sealing pressure is obtained. This latter feature is additionally useful because, when the ball is off its seat while the valve is open, liquid passing through the valve under pressure tangentially impinges against the substantial exposed portion of the ball, to impart rotation thereto, so that a different part of the ball surface is presented to the seat during each successive closing operation.

It is therefore an object of our invention to provide an improved ball valve which is capable of use for many years without the necessity of replacing any of the sealing parts.

It is another object to provide an improved ball valve in which the valve closure is effected without any relative rotation as between the ball and seat.

A more particular object of our invention is to provide an improved ball valve utilizing a nylon seat ring in conjunction with a stainless steel ball so mounted as to float in its mounting socket, with a substantial portion of the ball exposed to liquid to so rotate the ball that the latter will present a different surface portion for engagement with the seat during each successive closing operation.

Other more subordinate objects and advantages will appear from the following detailed description of a presently preferred embodiment of the invention, for which purpose we shall refer to the accompanying drawing wherein:

Fig. 1 is a medial section through our valve in open position;

Fig. 2 is a similar view but showing the valve in closed position;

Fig. 3 is a section taken on line 3—3 of Fig. 2; and

Fig. 4 is a medial section view of a modified form of our valve seat.

In the drawing, we show a conventional faucet valve casing 5 having a threaded cap 6 screwed onto its externally threaded neck portion, the cap having a recess 7 for the reception of a conventional packing member 8. The casing has an inlet 10 and an outlet 11, and is interiorly threaded at 15 to threadedly receive a plug 17 having a stem portion 18 carrying an operating handle 19. The casing also has a partition wall 20 separating the inlet from the outlet, the partition having an opening 22 providing an annular upwardly facing shoulder 23, into which opening a nylon valve seat ring 30 is force-fitted. We make the outside diameter of the nylon ring 30 slightly larger than the diameter of the opening 22, an ideal differential being .015". In installing the ring, we slightly reduce its normal diameter by chilling it before force-fitting it into the opening.

In the bottom end of the plug 17, we form a socket 32 in which a ball to be described is mounted for free movement, the socket being shaped as a segment of a sphere. We preferably make the spherical socket .09" deeper than the radius of the ball to be described.

In the socket 32, we floatingly mount a polished stainless steel ball 33 preferably of Rockwell test 59–62 "C" scale hardness. Inasmuch as the depth of the socket is slightly greater than the radius of the ball, the part of the plug forming the bottom edge of the socket is peened about the ball to prevent the ball from escaping from the socket, and to allow the ball to float or have free movement in the socket. The ball should have a diameter approximately 20% greater than the inside diameter of the opening in the ring 30, and at least one-third of the surface of the ball should be exposed below the plug.

A faucet valve constructed in accordance with our invention will not suffer any discernible wear, the only wear which can take place being the very slight wear on the seat ring caused by pressure of the ball against the seat.

In use, we find that by virtue of the characteristics of a nylon seat ring, the ring adheres to the ball to provide an efficient seal and to prevent any relative rotation as between the ball and the seat during closure of the valve, the plug merely rotating relative to the ball. On the other hand, when the valve is in open position, the ball will be rotated in its socket by the stream of liquid under pressure passing through the casing and tangentially impinging upon the substantial exposed portion of the ball, so that during each successive seating operation, the ball will present a different surface portion to engage the nylon ring.

In Fig. 4, we show a modified form of nylon seat ring 40, which differs from the ring 30 only in that it has a peripheral flange 41 at its top end and has circumferentially spaced radial protuberances 42 on its outer surface below the flange. This modified ring has substantially the same outside diameter below the flange as the inside diameter of the opening 22 in the partition of the casing, and is well suited for being installed by an unskilled person to replace an existing valve seat. The protuberances, which are force-fitted in the opening 22, are sufficient to retain the ring in the opening. The purpose of the flange 41 is to provide a stop to limit how far the ring extends into the opening 22 in case the valve casing is such as not to provide the annular stop shoulder 23 before described.

We claim:

In a faucet valve, a hollow casing having an inlet in its side and an outlet in its bottom, a partition separating said inlet from said outlet and having an opening therethrough, a valve seat member in the inlet end of said opening, said seat member having a flat annular surface towards said inlet, a plug threadedly mounted in said casing for movement towards and away from said seat member and presenting a bottom end portion having an inner surface defining a downwardly opening spherical socket and an uninterrupted smooth spherical outer surface converging with the bottom end of said inner surface to form a sharp annular edge portion defining the bottom end extremity of said plug; said inlet being disposed to direct liquid entering said casing through said inlet against said outer surface, a stainless steel ball valve floatingly mounted in said socket and having at least one-third of its surface depending from said socket and exposed below said edge, and an actuating stem rotatably carried by said casing for rotating said plug, said outer surface being disposed tangential to said exposed surface portion of said ball valve whereby to direct said liquid tangentially against said exposed surface portion of said ball valve for causing said ball valve to rotate relative to said plug when said ball valve is out of seating engagement with said seat.

References Cited in the file of this patent

UNITED STATES PATENTS

| | | |
|---|---|---|
| 230,173 | Brandies | July 20, 1880 |
| 994,268 | Milne et al. | June 6, 1911 |
| 1,508,047 | Bowler | Sept. 9, 1924 |
| 1,529,583 | Ehrmann | Mar. 10, 1925 |
| 1,871,072 | Miller | Aug. 9, 1932 |
| 2,375,980 | Charme | May 15, 1945 |
| 2,828,936 | Hales | Apr. 1, 1958 |
| 2,841,167 | Jacobson | July 1, 1958 |

FOREIGN PATENTS

| | | |
|---|---|---|
| 6,796 | Great Britain | Apr. 8, 1892 |
| 71,256 | Germany | Oct. 3, 1893 |
| 156,823 | Great Britain | Jan. 20, 1921 |
| 444,516 | Great Britain | Mar. 23, 1936 |